350-3.61
XR 3,731,373

United States Patent

[11] 3,731,373
[45] May 8, 1973

Johnson

[54] MANUFACTURING AN OPTICAL SHAFT ENCODER HAVING A HOLAGRAPHIC CODE DISK

[75] Inventor: Richard N. Johnson, Gaithersburg, Md.

[73] Assignee: The United States of America as represented by the Secretary of the Army, Washington, D.C.

[22] Filed: Dec. 21, 1971

[21] Appl. No.: 210,415

[52] U.S. Cl. ..................29/592, 250/231 SE, 350/3.5
[51] Int. Cl. ............................H01s 4/00, G02b 27/00
[58] Field of Search ..................350/3.5; 250/231 SE; 29/592

[56] References Cited

UNITED STATES PATENTS

| | | | |
|---|---|---|---|
| 3,580,656 | 5/1971 | Carson | 350/3.5 |
| 3,658,402 | 4/1972 | Nishida et al | 350/3.5 |
| 3,542,448 | 11/1970 | Reynolds et al. | 350/3.5 |
| 3,575,485 | 4/1971 | Van Buskirk | 350/3.5 |
| 3,619,033 | 11/1971 | McMahon | 350/3.5 |

OTHER PUBLICATIONS

Zweig, IBM Technical Disclosure Bulletin, Vol. 10, No. 6, Nov. 1967, p. 759
Pennington et al., IBM Technical Disclosure Bulletin, Vol. 11, No. 7, Dec. 1968, pp. 820–821

*Primary Examiner*—Ronald L. Wibert
*Assistant Examiner*—Ronald J. Stern
*Attorney*—Harry M. Saragovitz et al.

[57] ABSTRACT

A constant laser beam is directed toward a photosensitive code disk. A beam splitter diverts some light from the laser beam to drive first inputs of light modulators. The shaft of a standard reference shaft encoder is concentrically fixed to the disk and the encoder output bit lines are individually connected to second inputs of respective light modulators for selectively modulating the passage of light thereby generating light bit equivalents. The light bits are individually transmitted through fiber optics to projecting positions near the opposite side of the disk. By subjecting the disk to constant laser light on one side and changing bit light on the other side as the shaft turns, a diffraction grating is formed on the disk as a latent image. The photosensitive disk is developed and forms a permanent optical encoder disk for future use.

1 Claim, 1 Drawing Figure

3731373
OR IN 29/592

PATENTED MAY 8 1973 3,731,373
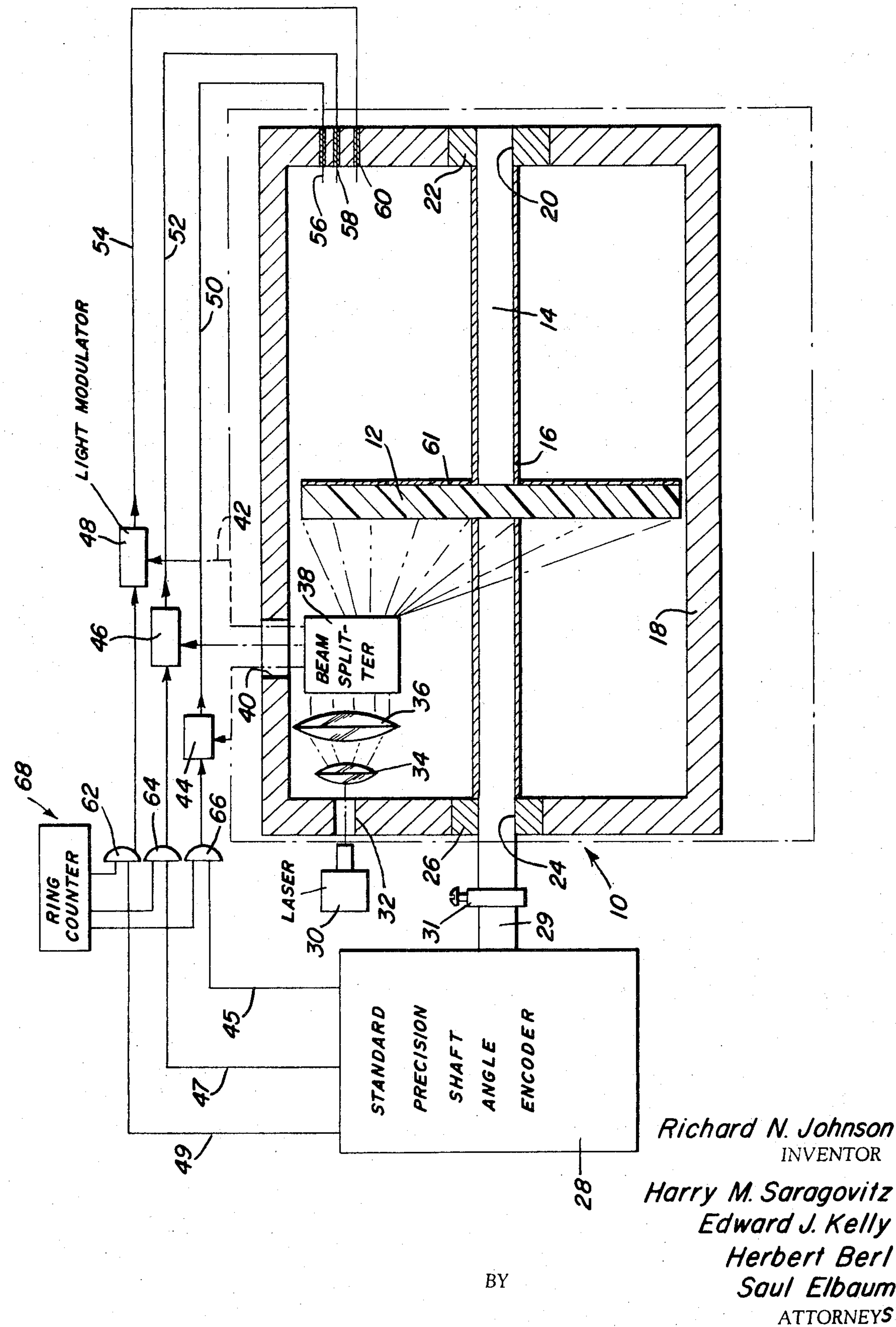
Richard N. Johnson
INVENTOR
BY
Harry M. Saragovitz
Edward J. Kelly
Herbert Berl
Saul Elbaum
ATTORNEYS

MANUFACTURING AN OPTICAL SHAFT ENCODER HAVING A HOLAGRAPHIC CODE DISK

The invention described herein may be manufactured, used, and licensed by or for the United States Government for governmental purposes without the payment to me of any royalty thereon.

FIELD OF THE INVENTION

The present invention relates to a method for manufacturing an optical shaft encoder, and more particularly to a procedure for forming a hologram on the disk which serves as a diffraction grating. By rotating the finished disk, laser light can be masked through the disk to develop unique optical codes dependent upon the angular position of the disk.

THE PRIOR ART

The transformation of analog information into digital intelligence is accomplished by using converters. When the analog information is in the form of mechanical movement such as shaft rotation, the conversion is usually accomplished by a widely used converter known as a shaft encoder. One of the most accurate and widely used encoder employes an optical method. This method incorporates the use of a transparent coded disk that is connected directly to a rotating shaft. The transparent disk is sandwiched between a light source and a plurality of photoelectric cells. The disk contains transparent and opaque sections wherein the transparent sections designate a binary "one" and the opaque sections designate a binary "0." As the code wheel is rotated, the photoelectric cells transmit the angular position of the code wheels, in the form of a code comprising binary "ones" and "0's," to a counter or indicating device.

Due to the cost of a high degree of required precision, these optical shaft encoders are expensive to manufacture and are delicate instruments. They are quite difficult to build and maintain, principally due to the difficulty in repeating the manufacture of high precision code disks. Typically, the least significant bit mask track is placed as near the rim of the disk as possible, and a point beam or "spot" of light is focused on this track. This procedure is likewise done on the more significant tracks. The accuracy of the encoder is determined by the limit of resolution. This in turn is determined by disk size, and the aperture of the diffraction limited optics that generate the "spots" of light, since making the bit mask smaller than this "spot" size is pointless.

The mechanical problem of obtaining alignment between the disk tracks and the light sensors also contributes heavily to the cost and servicing of previously developed optical encoders of the high resolution type.

SUMMARY OF THE INVENTION

The present invention involves the novel manufacture of manufacturing an encoder wheel with a diffraction grating pattern thereon. Further, by using the components required in manufacturing the code disk, a novel type of encoder structure can be realized.

Briefly, a constant laser beam is projected toward a photosensitive coated encoder disk. A portion of this beam is diverted to a plurality of light modulators which have respective bit electrical inputs derived from a precision shaft angle encoder which shares a common shaft with the disk undergoing manufacture. Optic fibers are respectively connected to the outputs of the light modulators thereby generating light spots or light bits at the ends of the optic fibers. These ends are positioned adjacent an opposite side of the disk undergoing manufacture. Thus, as the shaft interconnecting the manufactured disk and the precision shaft encoder undergoes rotation, the photosensitive disk will receive oppositely projected light energization from the constant laser beam and light bits. This generates a hologram. The coherent light from the laser will constructively and destructively interfere in the photosensitive medium, setting up standing waves that create a diffraction grating in the disk as finally photographically developed. Thereafter, the disk can operate in a final shaft encoder having the light source projecting through the disk having the diffraction grating therein. The optic fibers are freed from their connection with the modulators and are instead connected to photosensitive electronics such as photo-voltaic diodes. In this respect, as the shaft mounting the disk rotates, the generated light bits will be converted by the photosensitive electronics thereby providing the conversion of analog motion to digital form.

Other objects of the invention will appear from the following description, reference being made to the accompanying drawing.

BRIEF DESCRIPTION OF THE DRAWING

The FIGURE illustrates the schematic disposition of components during the manufacturing of an optical code disk having a diffraction grating formed thereon.

Referring to the drawing, reference numeral 10 generally indicates the structure of an optical shaft encoder. The heart of the encoder is a code disk 12 that is coaxially mounted to a shaft 14 having a non-reflective coating 16 that inhibits interference due to internally reflective light.

The housing for the encoder may take the form of a hollowed cylinder 18 having openings 20 and 24 in the transverse ends thereof for allowing passage of shaft 14 therethrough. Bearings 22 and 26 journal the shaft 14 in the openings 20 and 24, respectively.

A separate standard precision shaft angle encoder 28 serves as a reference and has its shaft 29 connected to the shaft 14 by a removable collar 31.

A laser light source, for example, G*a* A*s* diode is installed adjacent the left transverse end of the encoder housing 18. An aperture 32 is formed in this transverse end to allow passage of coherent light therethrough from the laser 30. Aligned with this aperture, in the interior of housing 18 is a lens 34 that outwardly spreads the narrow beam. Adjacent lens 34 is a second lens 36 that transforms the diverging rays from lens 34 into parallel beams that impinge upon a conventional beam splitter 38. As seen from the FIGURE, an aperture 40 is formed in housing 18 to allow one output of beam splitter 38 to impinge upon the light modulators 44, 46, 48 along beams schematically illustrated by reference numeral 42. The light modulators may, for example, be Kerr cells.

The binary bit output lines 45, 46, 49 from the standard shaft encoder 28 change state as the linked shafts 29 and 14 undergo controller rotation by a motor drive (not shown). The bit lines 45, 47 and 49 respectively enable modulators 44, 46 and 48 to permit passage of light from the beam splitter through the modulators. The passed light is fed back to the encoder housing 18 through optic fibers 50, 52 and 54 respectively associated with modulators 44, 46 and 48. The fiber optic ends 56, 58 and 60 respectively associated with the feedback fiber optics 50, 52 and 54. These optic ends are removably positioned in the right transverse end of the encoder housing 18. The idea is to have each optic end project a "spot" of light or light bit toward the disk 12 thereby generating an interference pattern on the disk 12 due to the oppositely directed beams from the optic fibers, and the optical path including laser 30 and beam splitter 38. Inasmuch as the code disk 12 has a photosensitive coating 61, the coating develops a latent image. After the shaft has undergone 360° rotation, the housing 18 is opened, the disk 12 is removed, and the disk is developed and fixed to form a permanent code disk.

The disk need not be removed: if 61 is KALVAR film, then flooding with hot water will develop and fix the latent image; if 61 is a photopolymerization film, merely flooding with water and mildly agitating will develop and fix the latent image. Taking NOTHING apart will probably further simplify and cheapen the manufacturing process.

It has been found that the "noise" term in the diffraction grating as finally developed on the disk can be reduced by eliminating simultaneous illumination by the fiber optics 56, 58 and 60. Accordingly, AND gates 62, 64 and 66 are provided in the path of the bit output lines 49, 47 and 45, respectively. A ring counter 68 sequentially enables gates 62, 64 and 66 at a frequency far higher than the rotational frequency of shaft 14. As a result, at each position of shaft 14, the photosensitive material on disk 12 is exposed to a single light bit at a time, until all the active bits have been thoroughly activated. This removes the "noise" terms in the diffraction grating that would otherwise result from mutual interference between the light coming from two or more fiber optics simultaneously.

Considering the theory behind the previously discussed method consider the following. While exposing the photosensitive material on disk 12 to the constant laser derived light and the modulated light, a hologram is produced on the disk. The coherent light from the laser light source 30 will constructively and destructively interfere in the photosensitive medium, setting up standing waves that create a diffraction grating in the developed disk. As the shaft 14 turns, and the fiber optic ends 56, 58 and 60 are serially illuminated, in accordance with the code generated by the standard encoder 28, different diffraction grating will be created in the disk. After developing and fixing the latent image in the disk, the disk can now be used as a permanent code disk.

To illustrate how this can be replaced in housing 8 to serve as an operating encoder, consider the following.

Collar 31 is loosened so that the encoder 28 can become separated from the optical shaft encoder 10. Next, the terminal connections between the light modulators and their respective fiber optics are disconnected. These terminals are then connected to respective photosensitive electronics such as photo-voltage diodes.

In operation of the device, by illuminating the disk 12 with the laser light source 30, the diffraction gratings in the disk will focus the source light and cause a "spot" of light to illuminate the end of each fiber optic (56, 58, 60) in a particular shaft position, the same fiber optic ends will be lighted as were illuminated with modulated light during the manufacturing process. Thus, each angular position of the disk will regenerate, in the fiber optics, the binary code that was present in these fiber optics while the disk was being exposed.

By virtue of the present improvement, the diffraction limited resolution in this design is determined, not by the aperture of a small light focusing lens system, but rather by the area of the disk that contains the diffraction grating. Since this aperture equals at least half the disk area, much higher resolution can be achieved with a smaller overall unit.

An additional advantage of the present invention resides in the fact that nicks, cuts, scratches, and bits of dust do not seriously damage the image created by a hologram. Since each bit of the code is essentially stored in the whole diffraction grating, loss of part of the grating does not mean loss of the information. Construction of the disk-shaft combination need not be tightly controlled as to actual runout, and similar problems, so long as rigid and undisturbed placement of the disk on the shaft is achieved. The focal length of the diffraction grating is the grating to fiber optic distance which is relatively long. By use of a long light path, some axial play in the shaft can be allowed.

Inasmuch as the present invention employs a laser, the laser can be pulsed or continuous, depending upon the demand of the logic system that the photosensitive readout devices feed.

Certain extensions of the discussed description become apparent when the principles of the invention are understood. Thus, the present invention is not limited to the measurement of rotational motion. On the contrary, the structural matter presented herein is capable of measuring in an exceedingly accurate manner, linear motion. One can also consider, by enlarging the disk and adding many more fiber optics, a read-only memory of very large capacity (with access times no longer than magnetic disk and drum memories) could be constructed quite inexpensively. For computer complexes having well established generating systems, such a memory could contain the operating system thus freeing disk and drum (magnetic) memories for dynamic storage chores.

It should be understood that the invention is not limited to the exact details of construction shown and described herein for obvious modification will occur to persons skilled in the art.

The invention claimed is:

1. A method for manufacturing an analog to digital shaft angle encoder utilizing apparatus comprising:

a standard shaft angle encoder as a reference;

output terminals of the reference encoder connected to control terminals of respective light modulators located externally of the encoder undergoing manufacture, the output terminals being selectively energized in a predetermined code sequence as the shaft of the reference encoder is made to turn thereby actuating the modulators in a corresponding sequence;

means connecting the shaft of the reference encoder to a shaft of the encoder undergoing manufacture so that both turn together;

the steps of manufacture consisting of:

subjecting a side of a photosensitive code disc, located on the shaft of the encoder being manufactured, to a reference beam of coherent light introduced by a source external of the encoder being manufactured;

subjecting the light modulators to light which is mutually coherent with the light from the source for passage through actuated modulators;

transmitting light along fiber optic light conducting means, from actuated modulators to fixed light projecting points adjacent an opposite side of the disc to form a latent holographic image on the disc;

developing the image as the disc remains in situ;

disconnecting the light conducting means from the modulators and connecting them instead to respective photo-detectors; and disconnecting the standard shaft encoder from the encoder undergoing manufacture thereby completing its manufacture;

whereby subjecting the disc to coherent light at different angular positions of the manufactured encoder shaft produces automatically aligned precise light outputs at the fixed light projecting points that are converted by the detectors to electrical signals unique for each angular position of the manufactured encoder shaft.

* * * * *